United States Patent [19]
Takeda

[11] Patent Number: 6,092,088
[45] Date of Patent: Jul. 18, 2000

[54] METHOD FOR CONTROLLING DOCUMENT PROCESSING APPARATUS CONNECTED TO NETWORK

[75] Inventor: Shoji Takeda, Matsudo, Japan

[73] Assignee: Canon Kabushiki Kaisha, Tokyo, Japan

[21] Appl. No.: 08/933,530

[22] Filed: Sep. 18, 1997

[30] Foreign Application Priority Data

Sep. 20, 1996 [JP] Japan .................................. 8-271838

[51] Int. Cl.[7] ............................ G06F 17/21; G06F 17/30
[52] U.S. Cl. .......................................... 707/500; 707/513
[58] Field of Search .................................. 707/500, 513, 707/329, 516, 523, 526; 345/329, 330; 395/200.31, 200.5; 709/217, 203, 201, 200

[56] References Cited

U.S. PATENT DOCUMENTS

| | | | |
|---|---|---|---|
| 4,633,430 | 12/1986 | Cooper | 364/900 |
| 5,191,525 | 3/1993 | LeBrun et al. | 364/419 |
| 5,529,407 | 6/1996 | Ikeda et al. | 400/82 |
| 5,737,599 | 4/1998 | Rowe et al. | 395/615 |
| 5,787,295 | 7/1998 | Nakao | 395/761 |
| 5,790,165 | 8/1998 | Kuboki et al. | 347/251 |

*Primary Examiner*—Joseph H. Feild
*Assistant Examiner*—Alford W. Kindred
*Attorney, Agent, or Firm*—Fitzpatrick, Cella, Harper & Scinto

[57] ABSTRACT

An object of the invention is to enable to designate contents of a process which is to be performed by a document processing apparatus connected to a network, from an another terminal on the network. In order to achieve the object, the present invention provides a method for controlling the document processing apparatus connected to the network, comprises a process step of processing a sheet-like original, a reception step of receiving predetermined data, a judgment step of judging whether or not the data received in the reception step is a parameter for processing the original in the process step, and a control step of causing the process step to process the original, by using the data which was judged as the parameter in the judgment step.

26 Claims, 9 Drawing Sheets

METHOD FOR CONTROLLING DOCUMENT PROCESSING APPARATUS CONNECTED TO NETWORK

BACKGROUND OF THE INVENTION

1. Field of the Invention

The present invention relates to a method for controlling a document processing apparatus which is connected to a network capable of connecting a plurality of equipments, from a terminal on the network.

2. Related Background Art

Conventionally, for example, a copy machine is connected to a network, a personal computer connected to this network sends image data to the copy machine, and a printer unit of the copy machine prints the obtained image data.

However, in a case where a document is placed on a scanner unit of the copy machine and then copied, an operator operates a console unit of the copy machine to perform desired processes.

Therefore, since it is necessary for the operator at the front of the copy machine to perform the complicated operations, there are some problems that the operator is troubled with complicated working and occupies the copy machine for a long time.

SUMMARY OF THE INVENTION

An object of the present invention is to provide a document processing apparatus which solved the above-described problems.

An another object of the present invention is to enable to designate contents of a process which is to be performed by the document processing apparatus connected to a network, from an another terminal on the network.

A still another object of the present invention is to reduce working after an operator sets a document to the document processing apparatus.

A further another object of the present invention is to enable to recognize termination of the process performed by the document processing apparatus.

The above and other objects, features, and advantages of the present invention will be apparent from the detailed description and the appended claims in conjunction with the accompanying drawings.

DETAILED DESCRIPTION OF PREFERRED EMBODIMENTS

Figure 1:
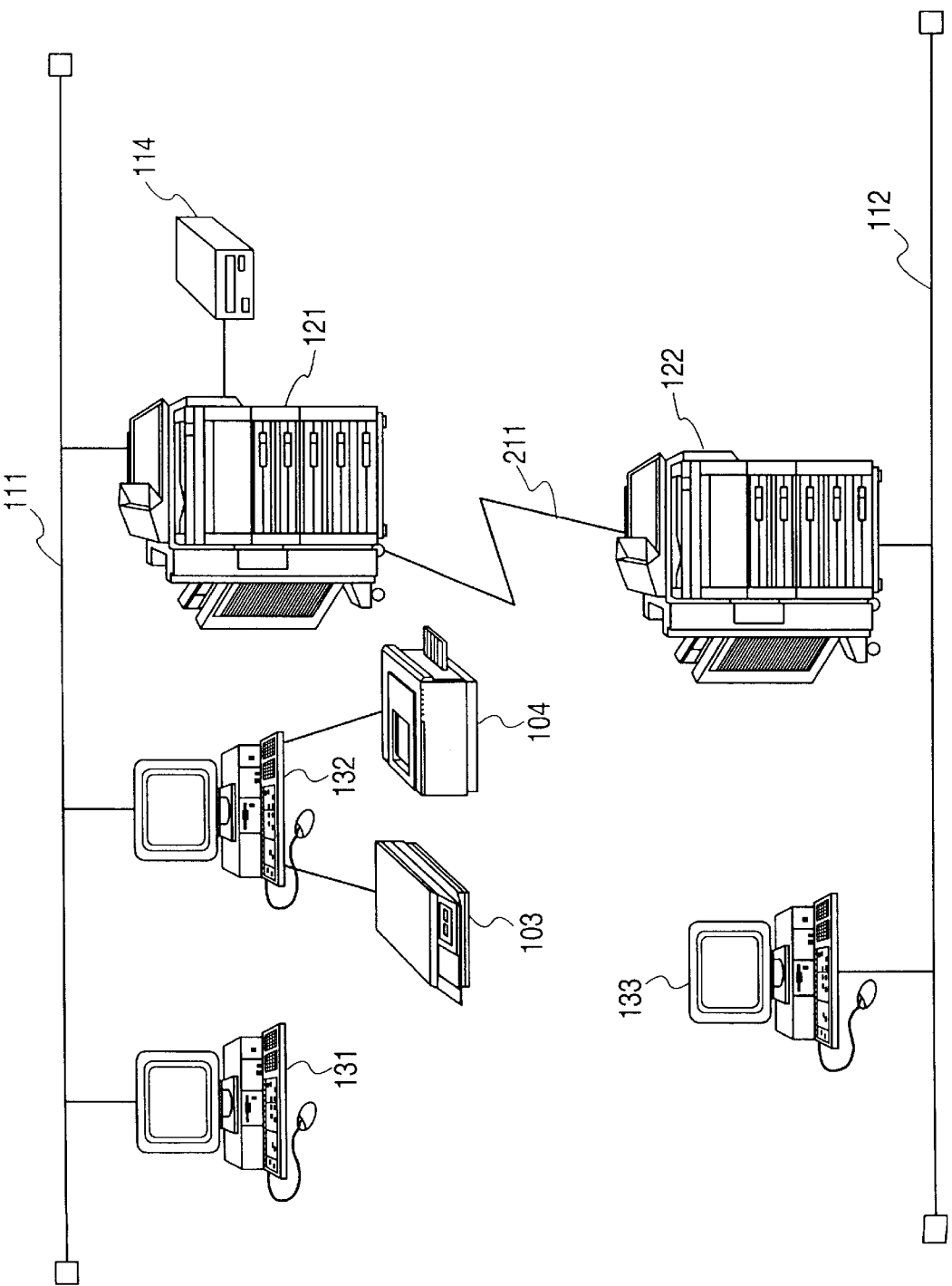
FIG. 1 is a view showing entire structure of a system according to embodiments of the present invention.

FIG. 1 is a view showing entire system structure according to an embodiment of the present invention.

Hereinafter, respective equipments and outline of their operation will be explained.

A network 111 is a local area network (to be referred as LAN hereinafter) which connects a copy machine 121, computers (to be referred as PC hereinafter) 131 and 132 and the like. Also, by an internal modem of the copy machine 121, the LAN 111 can be connected to a network 112 through a public line 211 and an internal modem of a copy machine 122.

The network 112 which is similar to the LAN 111 connects a computer 113, the copy machine 122 and the like.

The PC 131 is the computer which is ordinarily used by a user, and also acts as the equipment to form a document and transmit/receive an electronic mail (to be referred as E-mail hereinafter) to/from other computers connected to the LAN 111. Also, the PC 132 and the PC 133 have the similar functions respectively.

The PC 132 which is substantially the same as the PC 131 is connected to the LAN 111. Further, a scanner unit 103 and a printer unit 104 are connected to the PC 132 through a general-purpose interface provided in the PC 132.

The scanner unit 103 is used to apply an image obtained by scanning and reading an original, to the document formed in the PC 132. The printer unit 104 is used to print the image of the document formed in the PC 132, onto a recording paper.

A system consisting of the PC 132, the scanner unit 103 and the printer unit 104 has a simple copy function for printing the image read by the scanner unit 103 with the printer unit 104 in response to the operation of the PC 132.

The copy machine 121 which has a large-scale liquid crystal touch panel is a digital image formation apparatus connected to the LAN 111. The copy machine 121 has both a scanner function and a printer function. That is, the copy machine 121 itself has the function to copy the original. In addition, by connecting a magneto optical disk unit 114, the copy machine 121 has a function as an electronic filing apparatus. Further, the copy machine 121 has the function to print data sent from the computer or the like. Therefore, the copy machine 121 receives the document or the like formed by the PC 131 or 132 through the LAN 111 as image formation command data, develops the image included in the image formation command data into bit map image data, and then prints the obtained data. Also, the copy machine 122 has the similar functions.

In this case, although the original is at least a sheet-like original, of course a book-like original can be used.

Figure 2:
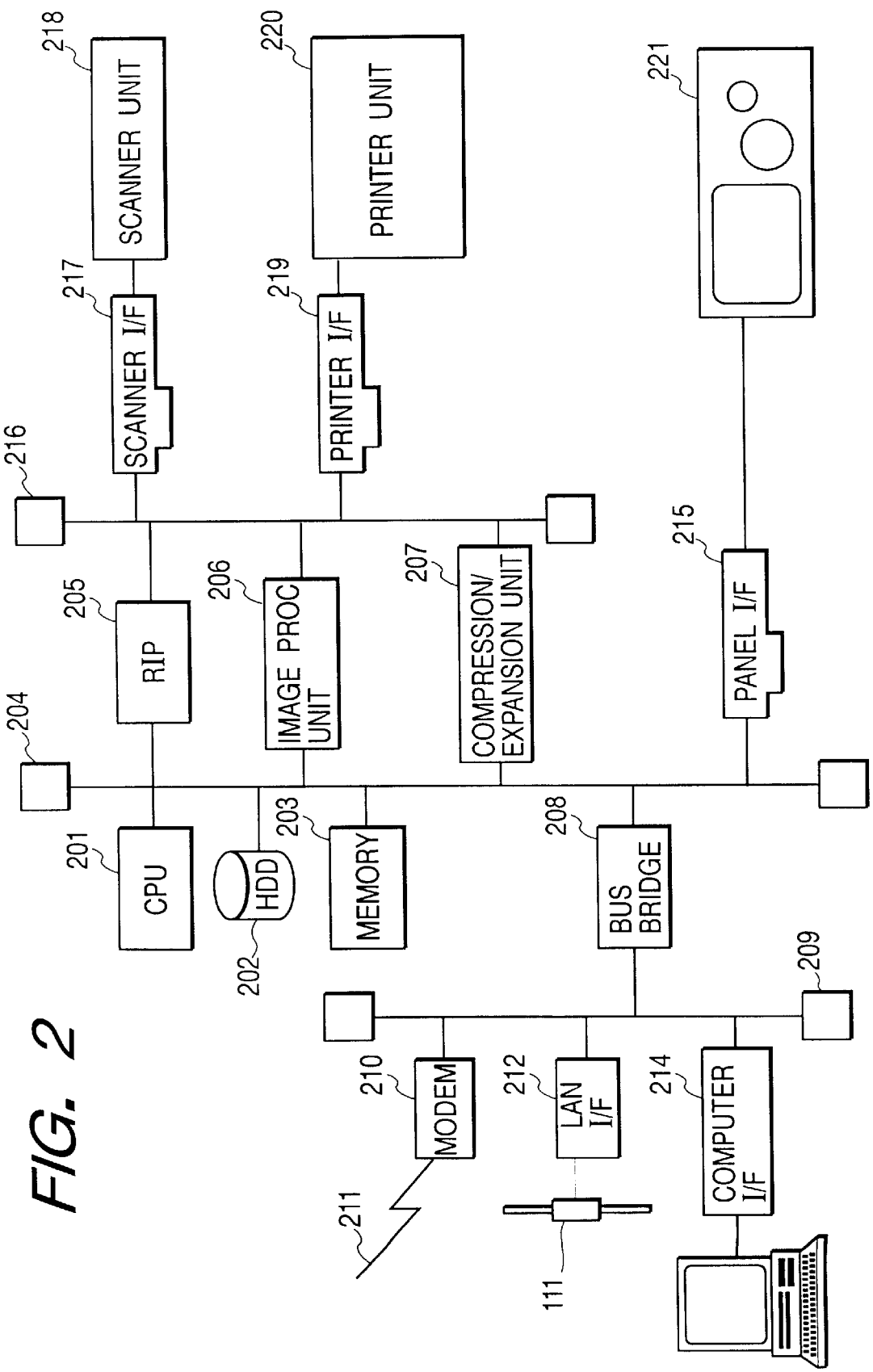
FIG. 2 is a block diagram showing internal structure of a copy machine according to the embodiments of the present invention.

Subsequently, common portions of the above-described copy machines 121 and 122 will be explained with reference to FIG. 2.

A CPU (central processing unit) 201 is a microprocessor which controls the copy machine as a whole, and is operated on the basis of a real time OS (operating system).

A HD (hard disk) 202 is a large-capacity hard disk which stores program data of a plurality of applications or the like necessary when the CPU 201 operates. The HD 202 is under the control of the CPU 201.

A memory 203 is a working memory which is used when the CPU 201 operates, and can be accessed from the CPU 201 at high speed.

A high-speed CPU bus 204 is a bus which connects the CPU 201, the HD 202 and the memory 203, and each functional unit (described later) to others. The high-speed CPU bus 204 is used to transfer data processed by the CPU 201 to each functional unit, and to transfer data among the functional units at high speed in a DMA (direct memory access) transferring system. Generally, a VL (VESA (Video Electronics Standard Association) local) bus or a PCI (peripheral computer interconnect) bus is used as the high-speed CPU bus 204.

A RIP (raster image processor) 205 is a functional unit which receives an image formation command inputted from an external interface connected to a computer (described later) and converts code information into a bit map image in accordance with the contents of the image formation command. The image formation command is inputted from the high-speed CPU bus 204 and used to output an image to a high-speed image bus 216 (described later). Generally, a PostScript, a PCL, a LIPS (LBP (laser beam printer) image processing system), a CaPSL (Canon printing system language) and the like can be managed by the RIP 205.

An image process unit 206 is a functional unit which performs, on the image inputted from the high-speed image bus 216, a filtering process such as a smoothing process, an edge process or the like in accordance with processing instructions from the CPU 201.

In addition, the image process unit 206 has an OCR (optical character recognition) function on the image inputted from the high-speed image bus 216, and an image separation function for separating a character portion and an image portion from each other.

A compression/expansion unit 207 compresses the image inputted from the high-speed image bus 216 in an image compression method such as an MH (modified Huffman) method, an MR (modified READ (relative element address)) method, and MMR (modified modified READ) method, a JPEG (joint photographic experts group) method or the like, and then sends compressed data to the high-speed CPU bus 204 or again to the high-speed image bus 216. On the contrary, the compression/expansion unit 207 expands the compressed data inputted from these two buses 204 and 216 in accordance with a compression form of this functional unit 207, and then sends the expanded data to the high-speed image bus 216.

A bus bridge 208 acts as a bus bridge controller to connect the high-speed CPU bus 204 with a low-speed CPU bus 209 (described later) and to absorb a difference in processing speed between these two buses. By providing the bus bridge 208, the CPU 201 which operates at high speed can access the functional units which are connected to the low-speed CPU bus 209 and operates at low speed.

The low-speed CPU bus 209 has bus structure of which transferring speed is lower than that of the high-speed CPU bus 204, and is a bus which connects the functional unit of which processing speed (i.e., processing ability) is relatively low. Generally, an ISA (industry standard architecture) bus can be used as the low-speed CPU bus 209.

A modem 210 is a functional unit which is provided between a public line 211 and the low-speed CPU bus 209. The modem 210 has a function for modifying digital data sent from the low-speed CPU bus 209 to be able to send it to the public line 211, and a function for converting modified data sent from the public line 211 into the digital data capable of being processed in the copy machine.

A LAN interface 212 is a functional unit which connects the copy machine with the LAN 111, and performs data transmitting/receiving through the LAN 111. Generally, an Ethernet or the like can be used as the LAN interface 212.

A computer interface 214 is a functional unit which connects the copy machine with the computer. That is, through the computer interface 214, the computer sends a control command to the copy machine, and the copy machine returns status to the computer. Generally, an RS-232C, a USB (universal serial bus) and a P1394 which perform serial communication, and a SCSI (small computer system interface) and Centronics interface which perform parallel communication can be used as the computer interface 214.

A panel interface 215 is a functional unit which sends and receives various control signals to and from a console unit 221 (described later) in the copy machine. That is, the panel interface 215 transfers a signal from an input switch such as a key or the like provided on the console unit 221 to the CPU 201, and performs resolution converting on the image data generated by the RIP 205, the image process unit 206 and the compression/expansion unit 207 to display the converted image data on a liquid crystal display unit on the console unit 221.

The high-speed image bus 216 is a bus which mutually connects image input/output buses in the various image formation units such as the RIP 205, the image process unit 206 and the compression/expansion unit 207, and a scanner interface 217 and a printer interface 219 (both described later) with others. The high-speed image bus 216 is not directly under the control of the CPU 201, but is controlled a bus controller to perform data transferring.

A scanner unit 218 is a visible image reading apparatus which has an automatic document feeding device. The scanner unit 218 includes R (red), G (green) and B (blue) three-line CCD color sensors or a black/white one-line CCD line sensor. The image data which was read by the scanner unit 218 is transferred to the high-speed image bus 216 through the scanner interface 217.

In the scanner interface 217, the image data which was read by the scanner unit 218 is binarized in an optimum method according to processing contents in subsequent steps, serial-to-parallel converting according to a data width of the high-speed image bus 216 is performed, and the read R, G and B three primary color data are converted into C (cyan), M (magenta), Y (yellow) and Bk (black) data.

The printer unit 220 prints the image data received from the printer interface 219 (described later) on the recording paper as visible image data. A bubble-jet printer which prints the image on the recording paper in a bubble-jet system, and a laser beam printer which utilizes electrophotographic technique for forming the image on a photosensitive drum by using a laser beam and then transferring it onto the recording paper can be used as the printer unit 220. Further, a single-color laser beam printer and a CMYBk color laser beam printer can be used as the laser beam printer of the printer unit 220.

The printer interface 219 transfers the image data sent from the high-speed image bus 216 to the printer unit 220. The printer interface 219 has a bus-width conversion function for converting a bus width of the high-speed image bus 216 into a bus width suitable for gradation of the printer which is intended to output the image data, and a function for absorbing a difference between printer printing speed and image data transferring speed of the high-speed image bus 216.

The console unit 221 has the liquid crystal display unit, a touch panel input device provided on the liquid crystal display unit, and a plurality of hard keys. A signal which was inputted by the touch panel or the hard key is sent to the CPU 201 through the above-described panel interface 215. The liquid crystal display unit displays the image data such as various messages and the like sent from the panel interface 215, and further displays the functions in the operation of the copy machine, the image data and the like.

Figure 3:
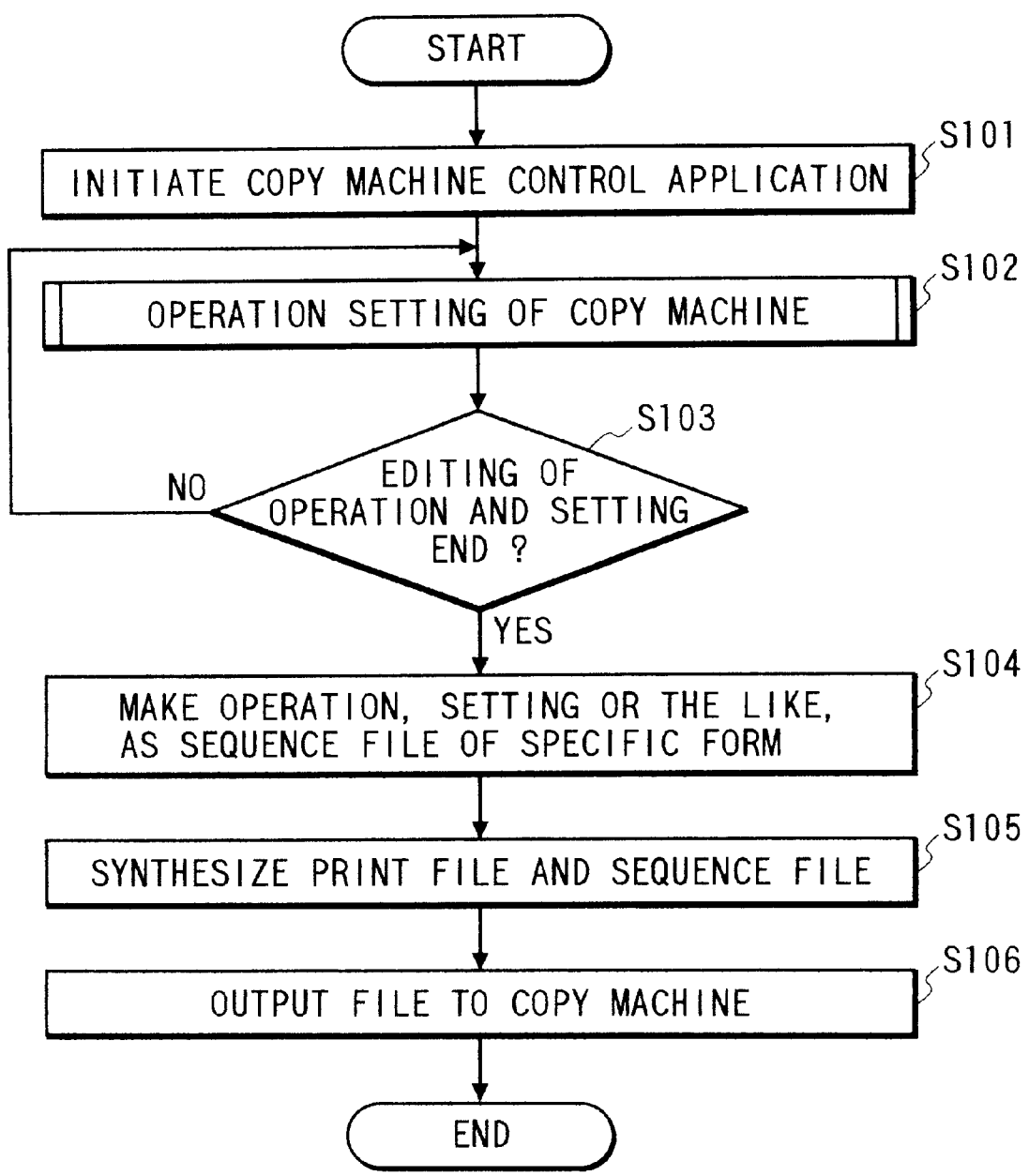
FIG. 3 is a flow chart showing operation on a computer side according to first to third embodiments of the present invention.
Figure 4:
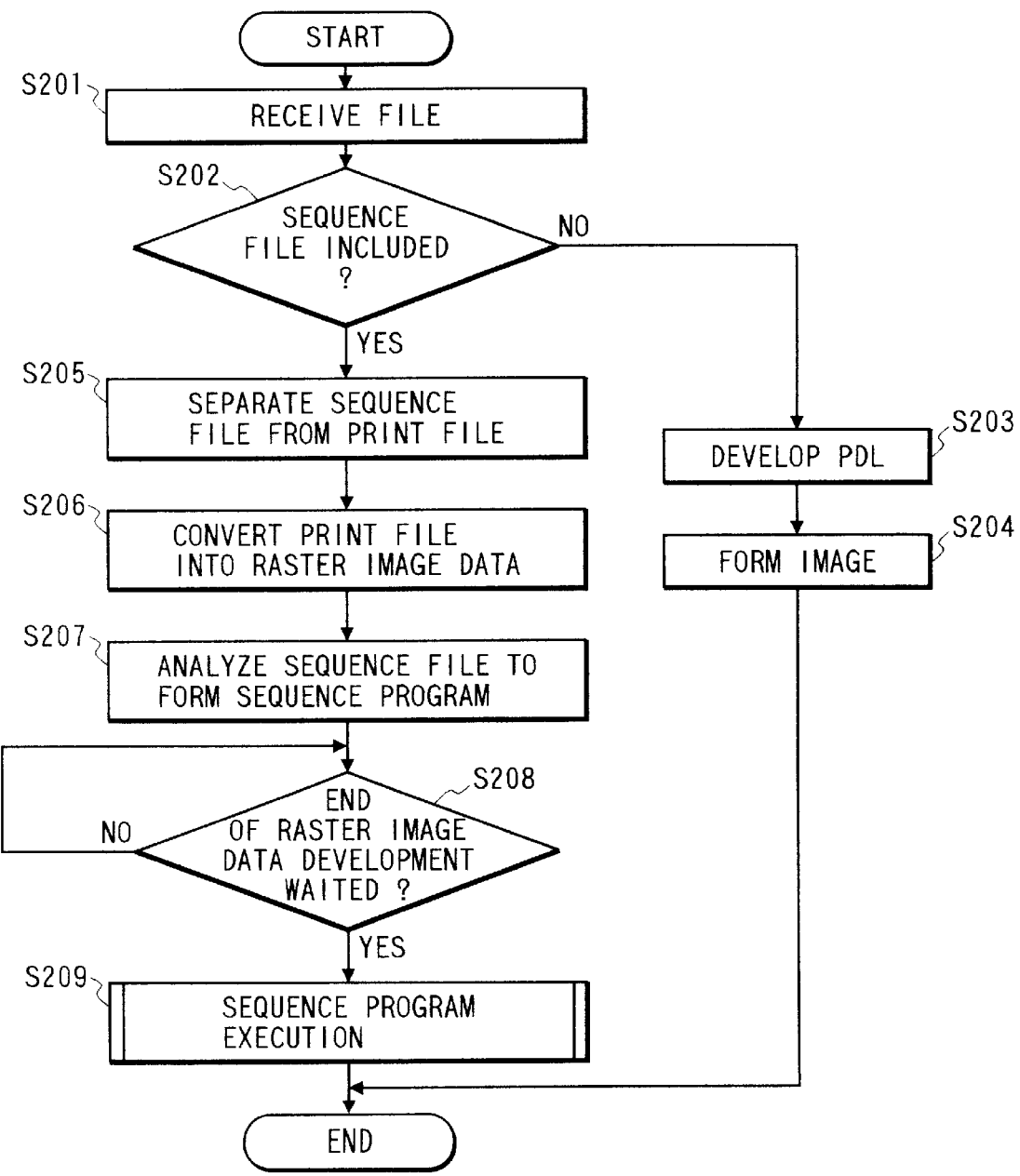
FIG. 4 is a flow chart showing operation on a copy machine side according to the first to third embodiments of the present invention.

Hereinafter, operation of such a system will be explained with reference to flow charts shown in FIGS. 3 and 4. In the explanation, it should be noted that all the equipments connected to the LANs 111 and 112 have been already powered and in circumstances that they can operate normally.

(Explanation of Operation on Computer (PC 131, 132 or 133) Side)

The operation on the computer side is controlled by a CPU of the computer on the basis of application programs (or software) which have been installed in a hard disk managed by the computer.

Initially, the application program is initialized to operate the copy machine. Then, in a window image plane on the display of the computer, a window which is the same as a console panel of the copy machine opens (step S101). Thus, the operator operates the copy machine on the window image plane of the computer by using a mouse cursor. At this time, in a case where the image is inset or sticked to a part of print image, the operator designates and sets such the image, a position thereof, a page number thereof, an image process method and the like on the other window. Further, a simple output result image plane is displayed on the other window at any time (step S102).

Then, the process in the step S102 continues until such the setting completely terminates (step S103). The setting contents based on the various setting operation actually performed in these steps S102 and S103 are managed as one file of specific form, i.e., a sequence file (step S104).

If there are a print file (i.e., object of sequence file) or the image data in the same computer system, the sequence file is combined with such the file or the data (step S105). However, there is only the sequence file in the computer, this step S105 is omitted.

Then, the copy machine to which such the operation and setting are performed is designated from among a plurality of selectable branches, and then the file is transferred to the designated copy machine (step S106).

(Explanation of Operation of Copy machine 121 or 122)

The operation of the copy machine is controlled by the CPU 201 on the basis of the program stored in the HD 202.

The files which have been transmitted from the LAN 111, the public line 211, the computer and the like respectively through the LAN interface 212, the modem 210, the computer interface 214 (e.g., the Centronics, the RS-232C) and the like are converted into the data respectively by the low-speed bus 209, the bus bridge 208 and the high-speed bus 204, and then transferred to the HD 202 to be stored.

Such the data transferring within the copy machine are performed in the form of DMA transforming, on the basis of the instructions from the CPU 201. Therefore, such the data transferring can be performed at relatively high speed, and a load to the CPU 201 is relatively small (step S201).

The CPU 201 judges whether the file transferred into the HD 202 includes the sequence file for the copy machine or is merely the print file (step S202).

If the file stored in the HD 202 is the ordinary print file, the PDL (page description language) of the file is judged and then the file is converted into raster image data by the RIP 205 in accordance with the corresponding PDL. In this case, the raster image data is developed into the memory 203 (step S203).

After the image process unit 206 or the compression/expansion unit 207 performs the processes in accordance with necessity, the raster image is transferred to the printer unit 220 through the high-speed image bus 216 and the printer interface 219 to perform the image forming (step S204).

If it is judged in the step S202 that the transferred file is composed of the sequence file and the print file for the copy machine, the CPU 201 separates such the file into the sequence file and the print file (step S205).

Then, the CPU 201 instructs the RIP 205 to develop the print file separated in the step S205 into the raster image data. The CPU 201 initiates the RIP 205, judges the kind of the PDL of the print file, and then starts to develop the print file into the raster image data (step S206).

After initiating the RIP 205 in the step S206, the CPU 201 starts to analyze the sequence file. For this reason, the processes in the steps S206 and S207 are performed by the RIP 205 and the CPU 201 in parallel, and then a sequence program in which operation procedure and setting have been described is formed (step S207).

The flow stands by until both the process (i.e., raster image data developing) performed by the RIP 205 in the step S205 and the process (i.e., sequence program forming) performed by the CPU 201 in the step S207 terminate (step S208).

As in case of actually operating the console panel on the copy machine, the CPU 201 accesses the devices on the high-speed CPU bus 204 in accordance with the sequence program to control the copy machine, thereby performing a series of processes (step S209).

Subsequently, it will be explained the processes in the step S102 of FIG. 3 and the step S209 of FIG. 4 which are the feature of the first embodiment of the present invention.

Initially, the process in the step S102 is explained with reference to FIG. 5.

Figure 5:
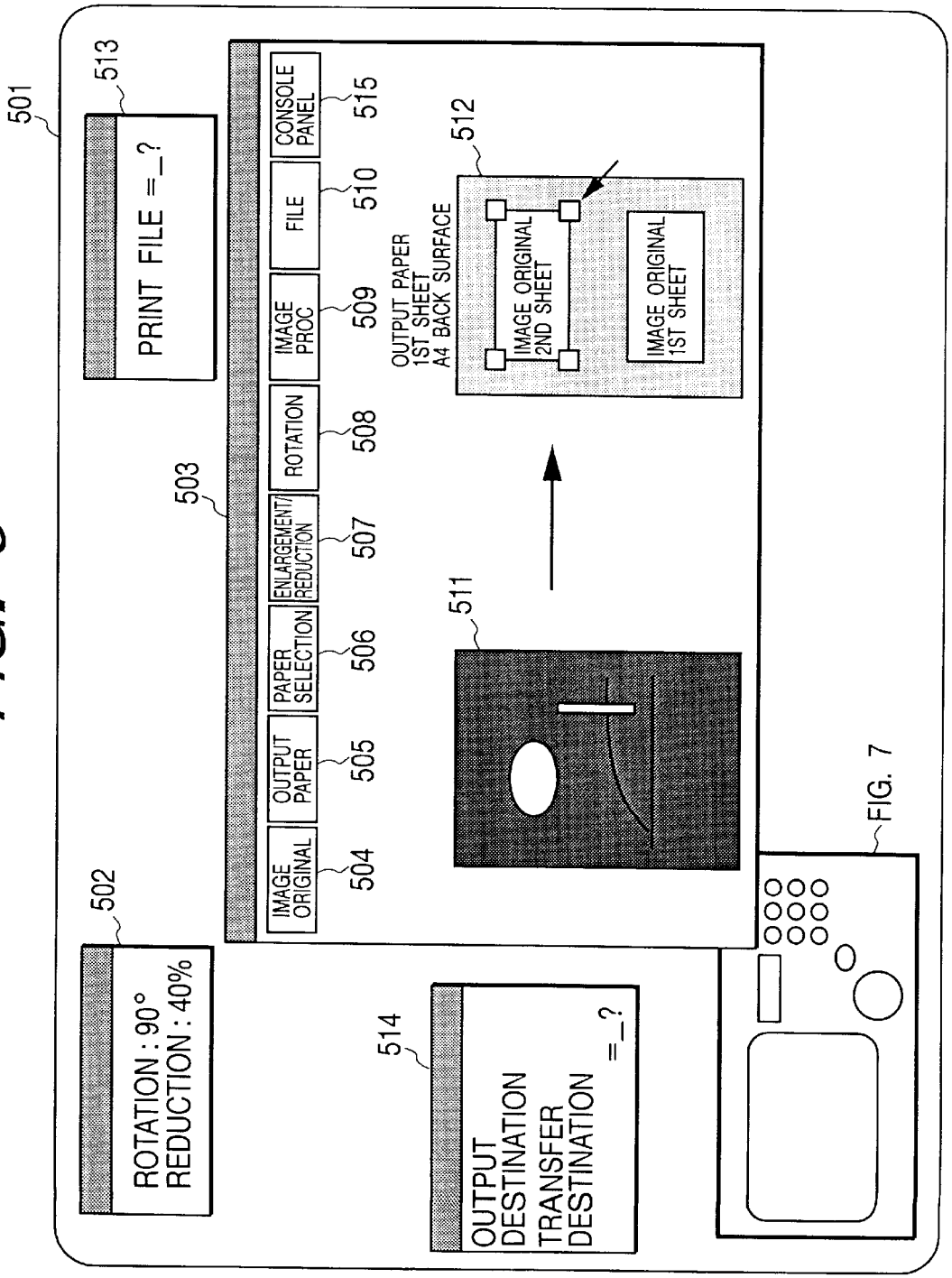
FIG. 5 is a view showing a configuration of a computer image plane according to the embodiments of the present invention.

FIG. 5 shows a console image plane 501 on the computer, which concerns the application program initiated in the step S101. In the image plane 501, a window 502 for sequentially describing the operations and an operation window 503 are displayed. The image plane 501 is operated by using a pointing device such as the mouse or the like.

Reference numerals 504 to 510 denote various operation switches. That is, the switch 504 is to select the page number of the original intended to be processed. The page number of the original is actually judged in the OCR manner. The switch 505 is to designate the page number of the output paper, the switch 506 is to designate the size and direction (i.e., landscape or portrait) of the output paper, the switch 507 is to determine the enlargement/reduction rate of the image in case of sticking the image of the original, the switch 508 is to determine the rotation angle of the image in case of sticking the image of the original, the switch 509 is to determine the image process on the image on the original, and the switch 510 is to terminate the file storing, the transferring and the editing.

Further, reference numeral 511 denotes a virtual image of the original intended to be processed, and only a frame of such the virtual image is actually displayed. Reference numeral 512 denotes simple arrangements of the print output image.

As the operator confirms the states of the virtual image 511 and the arrangements 512, he forms the sequence file to be transferred to the copy machine by using the switches 504 to 509.

Figure 6:
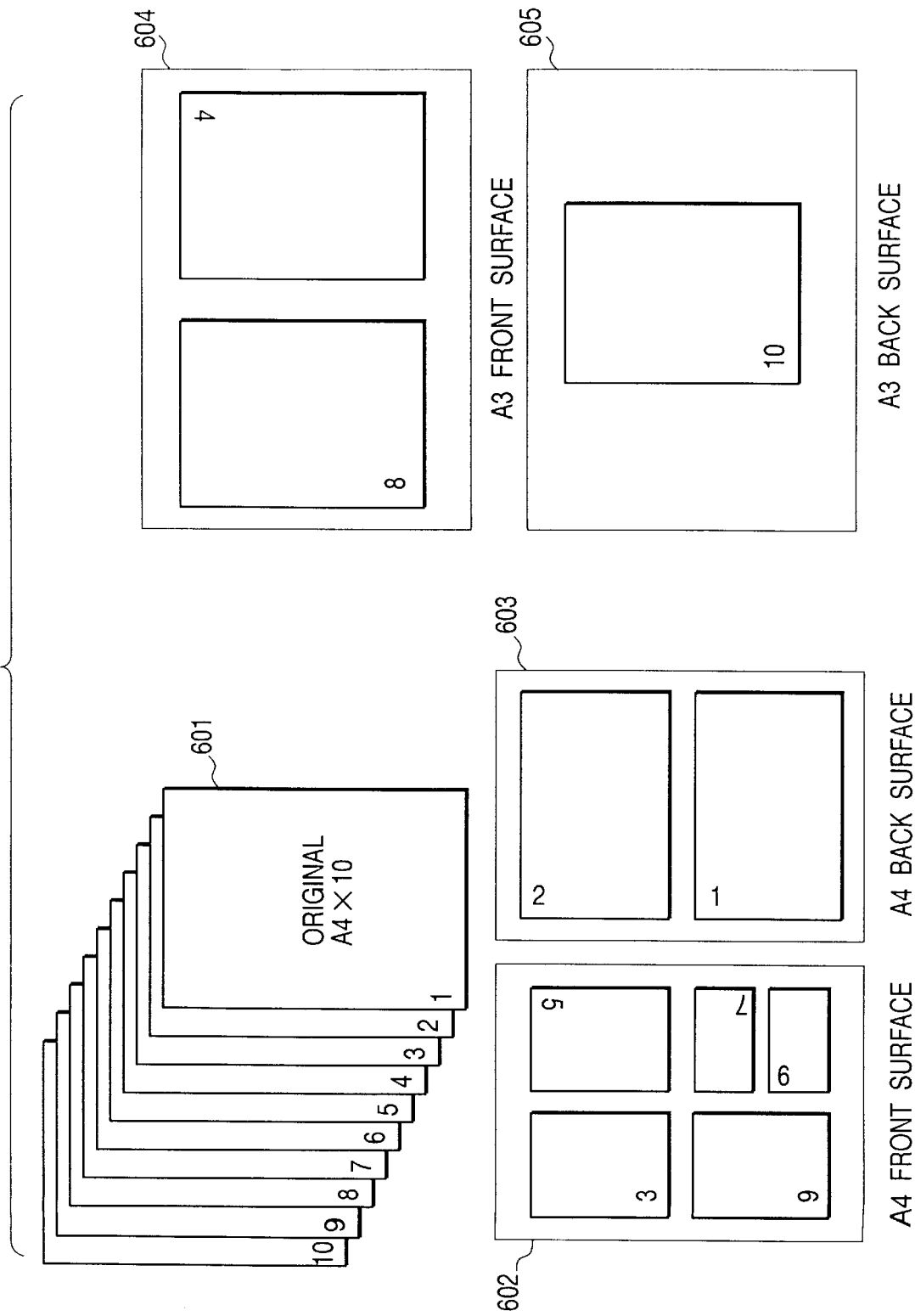
FIG. 6 is a view showing an example of arrangement of an original and print outputs used in the embodiments of the present invention.

Subsequently, an example of the process in the step S209 is explained hereinafter with reference to FIG. 6.

Reference numeral 601 denotes an original to be copied, and reference numeral 602 denotes an output image formed on a front surface of a first sheet of the recording paper. The output image 602 shows a case where third, fifth, sixth, seventh and ninth pages of the original are printed on such the recording paper at designated positions, in designated directions and with designated sizes, respectively.

Reference numeral 603 denotes an output image formed on a back surface of the first sheet of the recording paper. The output image 603 shows a case where first and second pages of the original are printed on the recording paper in "2 in 1" form. Further, an output image 604 (front surface) shows a case where fourth and eighth pages of the original are arranged and printed on the recording paper, and an output image 605 (back surface) shows a case where a tenth page of the original is arranged and printed on the recording paper.

As described above, the images of the original 601 are processed according to the sequence program and outputted as in the output images 602 to 605.

Subsequently, the processes in the step S102 of FIG. 3 and the step S209 of FIG. 4 according to a second embodiment of the present invention are explained hereinafter.

Initially, the process in the step S102 is explained with reference to FIG. 5.

In FIG. 5, there are used in the second embodiment a window 514 for performing the setting to output the file from the copy machine or transfer the file to the computer on the LAN, and a switch 515 for opening an operation window (FIG. 7) which is substantially the same as the console panel of the copy machine.

Figure 7:
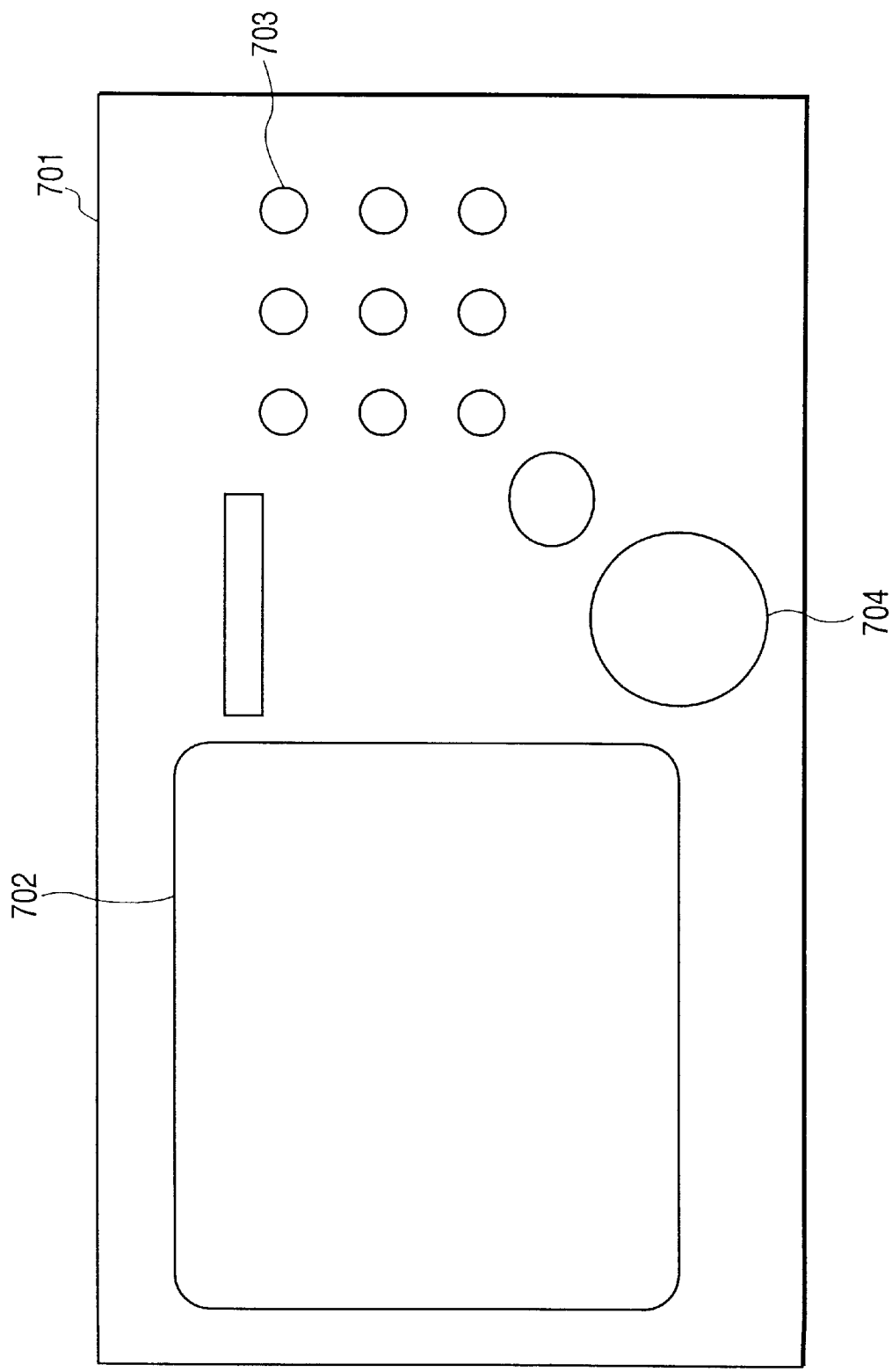
FIG. 7 is a view showing a part of the computer image plane according to the embodiments of the present invention.

In the second embodiment, the operator depresses the console panel switch 515 to open the window shown in FIG. 7. Then, the operator depresses a copy switch 704 in the window to form a virtual scanning image and display it as well as the page in the virtual image 511. In this case, the virtual scanning image is the image in which the original intended to be processed is virtually displayed with only the frame thereof.

Subsequently, when the operator selects "transfer" from a pulldown menu by depressing the file switch 510, the window 514 opens. Thus, he inputs a transfer destination or an output destination. It should be noted that such the transfer destination is the computer or the like to which the image read by the scanner unit 218 of the copy machine is transferred.

By the above operation, the image of the original can be transferred to the plurality of computers as the file. Further, if the file of the original image is transferred to the computer which is being utilized by the operator, he can cause such the computer to process the original image by using the scanner unit 218 of the copy machine on the LAN.

Subsequently, the process in the step S209 according to the second embodiment is explained hereinafter.

Initially, the operator confirms whether or not the original (sheet or book) is being set on the scanner unit 218. If not, the console unit 221 displays a demand for the operator to set the original on the unit. Subsequently, the scanner unit 218 reads all the images of the original, the compression/expansion unit 217 compresses the read image data, and then the HD 202 stores the compressed image data as the image file.

After then, the CPU 201 initiates an E-mail application program (or software), so that the image file stored in the HD 202 is transferred by using a protocol for E-mail to the computer which has been designated as the transfer destination. It should be noted that such the transferring is performed through the modem 210, the LAN interface 212, the computer interface 214 and the like.

Subsequently, the processes in the step S102 of FIG. 3 and in the step S209 of FIG. 4 according to a third embodiment of the present invention will be explained hereinafter.

Initially, the process in the step S102 according to the third embodiment is explained.

In FIG. 5, when the operator selects "print file" from the pulldown menu by depressing the output paper switch, the window 513 opens. Thus, he inputs the file name to select the print file. This print file is necessary to have been previously stored in the memory of the computer. The image of the designated page of the selected print file is displayed in the virtual image 511. The original image is sticked and the partial image process is designated by the same operation as that in the first and second embodiment. That is, e.g., if the virtual image 511 is sticked to the arrangement 512 with the same size by using the mouse or the like, the sticking of the original image can be performed.

In the present embodiment, it is assumed that the print output is obtained by sticking the selected print file to the entire recording paper and further sticking the original image read by the scanner unit 218 to the designated position on the recording paper. It should be noted that, e.g., in one format, the original image is an image such as a photograph or the like to be sticked to a blank space of such the format.

Subsequently, the process in the step S209 according to the third embodiment is explained hereinafter.

Initially, the operator confirms whether or not the original is being set on the scanner unit 218. If not, the console unit 221 displays a demand for the operator to set the original on the scanner unit 218. Subsequently, the scanner unit 218 reads all the images of the setting original and the HD 202 stores the read image data. After then, the RIP 205 develops the print file into the raster image data. The image read by the scanner unit 218 is subjected to the process based on the sequence file such that the image is located at a predetermined position and has a predetermined size, and further subjected to the image process based on the designation. Then, the processed image is synthesized to the print file image, and the printer unit 220 performs the image forming.

Subsequently, a fourth embodiment of the present invention will be explained hereinafter.

Figure 8:
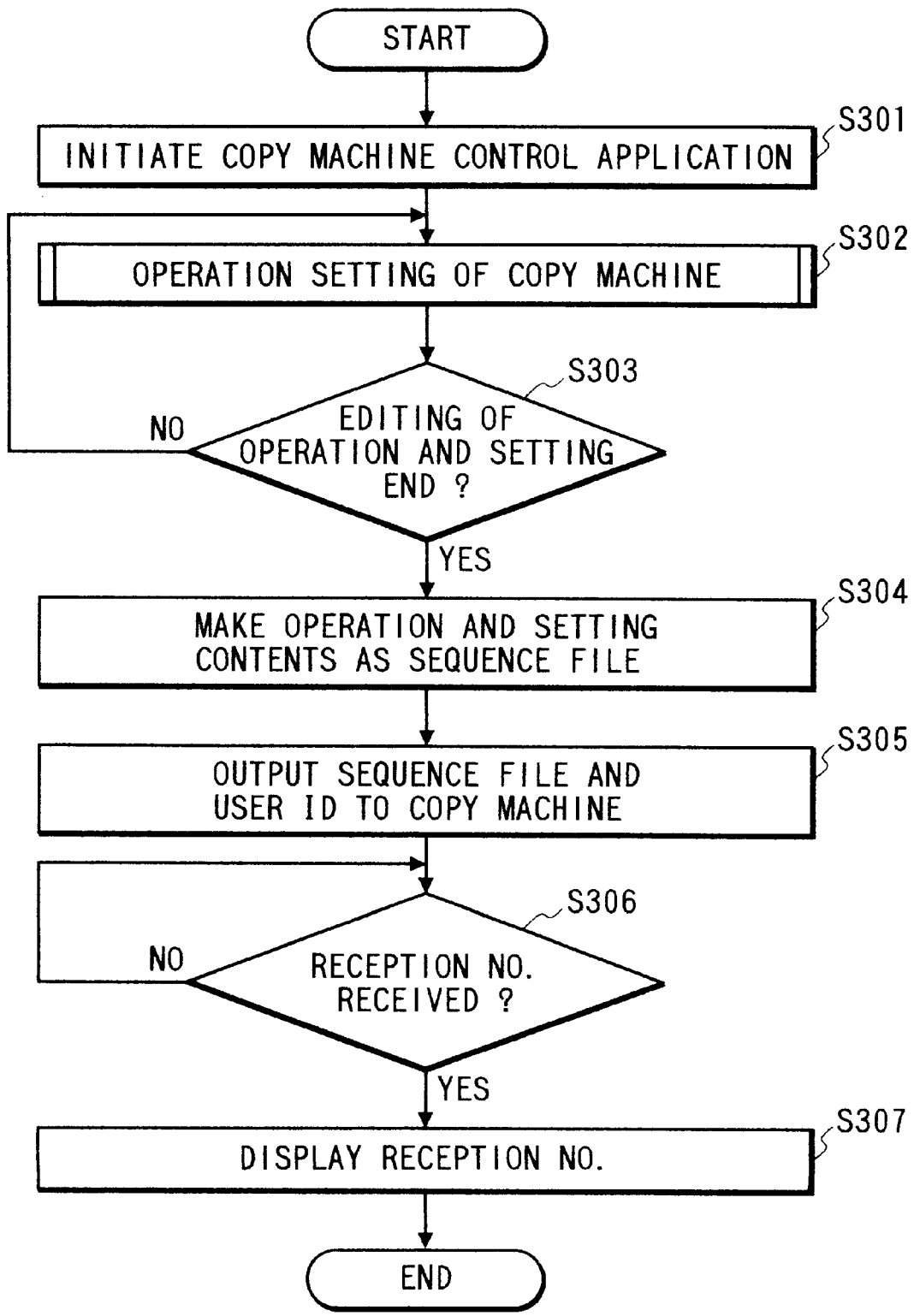
FIG. 8 is a flow chart showing operation on the computer side according to a fourth embodiment of the present invention.
Figure 9:
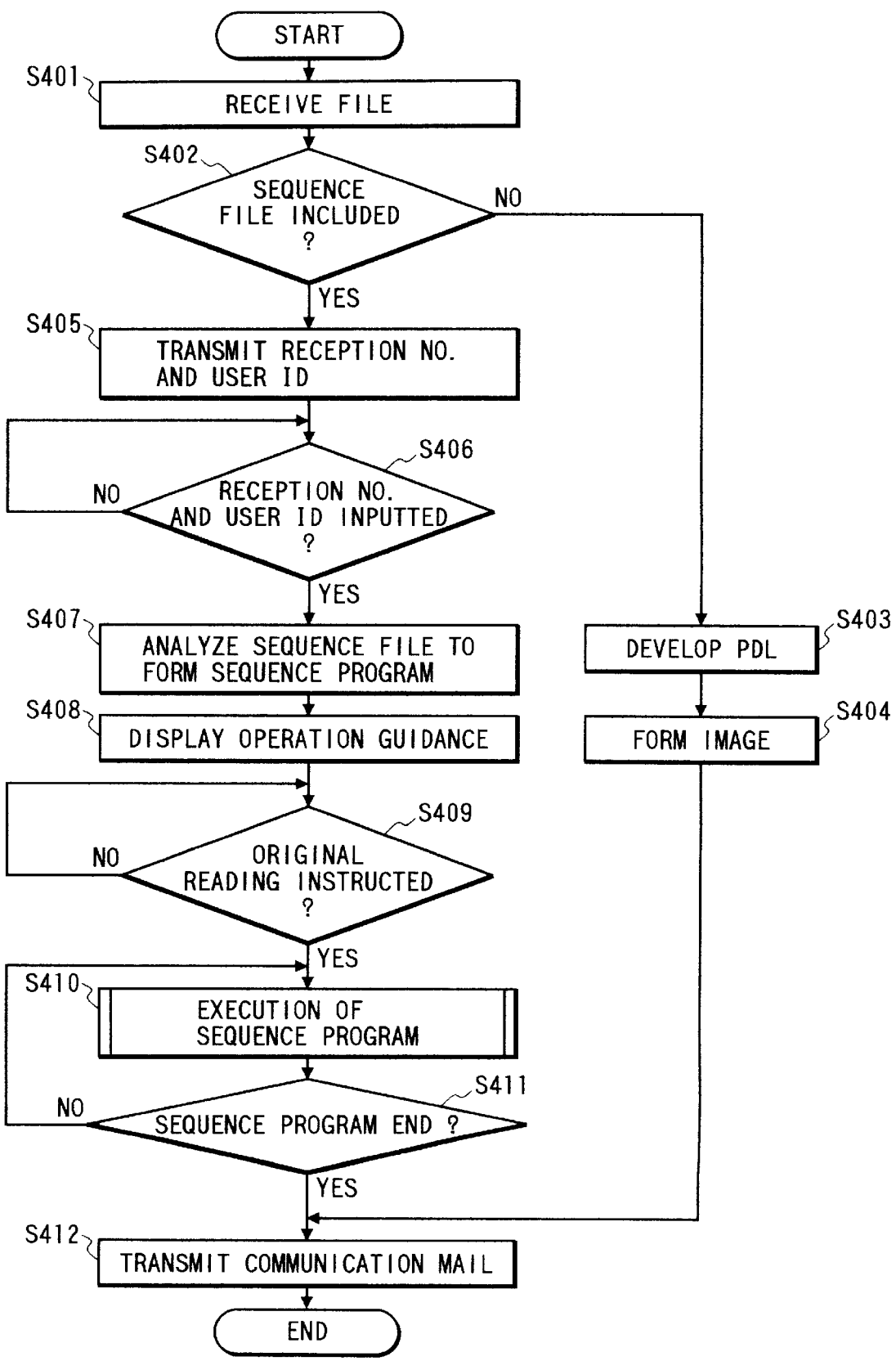
FIG. 9 is a flow chart showing operation on the copy machine side according to the fourth embodiment of the present invention.

Initially, system operation according to the fourth embodiment is explained with reference to flow charts shown in FIGS. 8 and 9. In the present embodiment, it should be noted that the structure of the system and the copy machine are shown in FIGS. 1 and 2 in the same manner as in the first to third embodiments.

(Explanation of Operation on Computer (PC 131, 132 or 133) Side)

It should be noted that such the operation is controlled by the CPU of the computer on the basis of the application program (or software) which has been installed in the hard disk managed by the computer.

Initially, when the operator initiates the application program to operate the copy machine, the window which is substantially the same as the console unit 221 of the copy machine opens on the display of the computer (step S301).

Subsequently, the operator performs the setting or the like for the operation of the copy machine by using the mouse or the like (step S302). Such the setting operation is the same as that already explained in the above-described step S102 of the first to third embodiments. The operation in the step S302 continues until a step S303 judges termination of the setting.

The contents set in the step S302 are made as the file of specific form, and the sequence file is formed (step S304). Then, this sequence file and user ID (identification) inherently added to each user in the common LAN are outputted to the copy machine selected as the setting target (step S305). In this case, if the computer already performed log-in operation, the application program automatically recognizes the user ID, and thus such the recognized user ID is notified to the copy machine. However, the operator may directly input his own user ID.

In case of normally performing the process in the step S305, the flow waits for a reception number to the sequence file which is sent from the selected copy machine (step S306). It should be noted that each sequence file is allocated with the different reception number. Then, if the computer receives the reception number together with the user ID for recognition, the information, e.g., the reception number, the simple setting contents etc. is displayed on the display of the computer (step S307).

(Explanation of Operation of Copy Machine 121 or 122)

Such an operation flow is controlled by the CPU 201 on the basis of the program stored in the HD 202.

The files transferred from the LAN 111, the public line 211 and the computer respectively through the LAN interface 212, the modem 210 and the computer interface 214 are subjected to the data converting by the low-speed CPU bus 209, the bus bridge 208 and the high-speed CPU bus 204, and then stored in the HD 202 (step S401).

Subsequently, it is judged whether or not the file transferred to the HD 202 includes the sequence file to the copy machine 121 or 122 (step S402).

If the file stored in the HD 202 is the print file, the flow advances to a step S403. In the step S403, the PDL (page description language) of the print file is judged, the print file is converted into the raster image data by the RIP 205 in accordance with the corresponding PDL, and the obtained raster image data is developed into the memory 203. Then, after performing the processes by the image process unit 206 and the compression/expansion unit 207 in accordance with necessity, the raster image data is transferred to the printer unit 220 through the high-speed image bus 216 and the printer interface 219, and thus the image is formed on the recording paper (step S404).

On the other hand, if the file stored in the HD 202 is the sequence file, the copy machine transmits, to a user (i.e., computer) who sent this sequence file, the reception number to be added to this sequence file and the user ID (same as that sent from the user) for confirmation (step S405).

The flow waits until the operator inputs the user ID and the reception number by the console unit 221 (step S406). When the user ID and the reception number are inputted, the sequence file corresponding to the inputted reception number is searched in the HD 202 and the contents thereof are analyzed. Then, this sequence file is loaded into the memory 203 as the executable sequence program (step S407).

Subsequently, the console unit 221 displays a guidance as to the working which should be performed by the operator for the process on the basis of the sequence program (step S408). It should be noted that such the displayed guidance relates to original setting methods (i.e., front/back, portrait/landscape etc.) and the like.

When the original is set to the scanner unit 218 and the image reading starts in response to the depressing of the start key on the console unit 221 (step S409), the original image is processed according to the sequence program and then outputted onto the recording paper by the printer unit 220 (step S410), as explained in the step S209 of the above-described first to third embodiments. Further, stapling, sorting and the like are performed in accordance with necessity.

If it is judged in a step S411 that the process based on the sequence program terminates, the flow advances to a step S412 to notify the user (i.e., computer) of the process terminating as well as the reception number and the user ID, by means of the E-mail based on an internet protocol. In the case where the process abnormally terminates due to an error, the mail representing the contents of such error is transmitted. Further, in the case where the image forming in the step S404 terminates, the mail representing the process terminating is transmitted. On the other hand, in the case where the process normally terminates, the target file in the HD 202 is deleted.

According to the above-described embodiments of the present invention, since the operation (i.e., operation which has been conventionally performed on the console unit of the copy machine) for the desired copy machine connected to the LAN can be set from the computer of each user, the time necessary for operating the console unit of the copy machine can be shortened, whereby it can be prevented that the operator occupies the copy machine for a long time. Further, since the sequence files have been previously sent to the copy machine collectively and one of the files is selected by the copy machine, the plurality of working can be easily performed sequentially and continuously.

Furthermore, since the operation guidance is displayed when the sequence program is executed, even if a substitute operator is requested to perform the working, he can easily perform the working.

Furthermore, since the mail is transmitted to the user after the process terminated, the user who received the mail can easily recognize the process terminating.

Furthermore, since the various parameters can be set on the large-scale image plane of the computer, operability can be improved. Moreover, simple previewing can be also performed.

The present invention can be applied to a system constructed by a plurality of equipments (e.g., host computer, interface equipment, reader, printer and the like) or can be also applied to an apparatus comprising a single equipment (e.g., copy machine, facsimile machine).

The invention employed by a method whereby program codes of a software to realize the functions of the above described embodiments are supplied to a computer in an apparatus or a system connected to various devices so as to make the devices operative in order to realize the functions of the above-described embodiments and the various devices are operated in accordance with the programs stored in the computer (CPU or MPU) of the system or apparatus is also included in the scope of the present invention.

In such a case, the program codes themselves of the software realize the functions of the above-described embodiments and the program codes themselves and means for supplying the program codes to the computer, e.g., a memory medium in which the program codes have been stored, construct the present invention.

As such the memory medium to store the program codes, e.g., it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiments of the present invention even in not only a case where the functions of the above-described embodiments are realized by executing the supplied program codes with the computer but also a case where the functions of the above-described embodiments are realized in cooperation with the OS (operating system) by which the program codes operate in the computer or another application software or the like.

Further, it will be also obviously understood that the present invention also incorporates a case where the supplied program codes are stored into a memory provided in a function expansion board of the computer or a function expansion unit connected to the computer and, after that, the CPU or the like provided in the function expansion board or the function expansion unit executes a part or all of the actual processes on the basis of instructions of the program codes, and the functions of the above-described embodiments are realized by the processes.

Although the present invention has been described above with respect to the preferred embodiments, the present invention is not limited to the above-described embodiments but many modifications and variations are possible with the spirit and scope of the appended claims.

What is claimed is:

1. A document processing apparatus connected to a network, comprising:

reading means for reading a sheet-like original;

process means for processing image data based on the sheet-like original read by said reading means;

reception means for receiving predetermined data from the network;

judgment means for judging whether or not the data received by said reception means from the network is a parameter for processing the image data by said process means; and control means for causing said reading means to start reading the sheet-like original based on a designation of the data which was Judged as the parameter by said Judgment means and for causing said process means to process the image data based on the sheet-like original read by said reading means by using the data which was judged as the parameter by said judgment means.

2. An apparatus according to claim 1, wherein said control means converts the data received by said reception means into an image and outputs the obtained image, in a case where said judgment means judges that the data received by said reception means is not the parameter.

3. A method for controlling a document processing apparatus which is connected to a network and processes a sheet-like original, said method comprising the steps of:

displaying a graphical image for performing setting of the document processing apparatus in the case of reading the sheet-like original by the document processing apparatus;

generating data to be used for operating the document processing apparatus to read the sheet-like original, on the basis of the displayed graphical image; and transmitting the generated data via the network to the document processing apparatus that should read the sheet-like original for causing the document processing apparatus to read the sheet-like original based on the generated data.

4. A method according to claim 3, wherein the displayed graphical image represents a console unit of the document processing apparatus.

5. A method according to claim 3, wherein the data to be used for operating the document processing apparatus is managed as one file.

6. A method according to claim 5, wherein data representing an image is further coupled.

7. A document processing apparatus connected to a network, comprising:

reading means for reading a sheet-like original;

process means for processing image data based on the sheet-like original read by said reading means;

reception means for receiving data, from the network, to be used for operating the document processing apparatus for processing the image data based on the sheet-like original;

setting means for setting ID (identification) data to the data received by said reception means;

input means for inputting the ID data set by said setting means; and control means for causing said reading means to start reading the sheet-like original in accordance with the data received by said reception means and then causing said process means to process the image data based on the sheet-like original read by said reading means, in a case where the ID data was inputted by said input means.

8. An apparatus according to claim 7, further comprising output means for outputting guidance information on the basis of the data received by said reception means, in the case where the ID data was inputted by said input means.

9. An apparatus according to claim 7, further comprising notification means for notifying a client that the processing by said process means terminated.

10. A method for controlling a document processing apparatus which is connected to a network and processes a sheet-like original, said method comprising the steps of:

generating data to be used for operating the document processing apparatus to read the sheet-like original;

transmitting the generated data, via the network, to the document processing apparatus, together with a user ID (identification);

receiving a code to be used for identifying the transmitted data; and outputting the received code, wherein the generated data to be used for operating the document processing apparatus is the data capable of causing the document processing apparatus to read the sheet-like original by inputting the outputted code into the document processing apparatus on a data transmission destination.

11. A method according to claim 10, wherein, in case of generating the data to be used for operating the document processing apparatus, pseudo displaying of an output result is graphically performed.

12. A method for controlling a document processing apparatus connected to a network, said method comprising:

a reading step of reading a sheet-like original;

a process step of processing image data based on the a sheet-like original read by said reading step;

a reception step of receiving predetermined data from the network;

a judgment step of judging whether or not the data received in said reception step is a parameter for processing the image data in said process step; and a control step of causing said reading step to start reading the sheet-like original based on a designation of the data which was judged as the parameter by said judgment step and for causing said process step to process the image data based on the sheet-like original read by said reading step by using the data which was judged as the parameter in said judgment step.

13. A method for controlling a document processing apparatus connected to a network, said method comprising:

a reading step of reading a sheet-like original;

a process step of processing image data based on the a sheet-like original read by said reading step;

a reception step of receiving data, from the network, to be used for operating the document processing apparatus for processing the image data based on the sheet-like original;

a setting step of setting ID (identification) data to the data received in said reception step;

an input step of inputting the ID data set in said setting step; and a control step of causing said reading step to start reading the sheet-like original in accordance with the data received by said reception means and then causing said process step to process the image data based on the sheet-like original read by said reading step, in a case where the ID data was inputted in said input step.

14. A computer readable program, stored in a storage medium, for controlling a document processing apparatus connected to a network, said program comprising:

a reading step of reading a sheet-like original;

a process step of processing image data based on the a sheet-like original read by said reading step;

a reception step of receiving predetermined data from the network;

a judgment step of judging whether or not the data received in said reception step is a parameter for processing the image data in said process step; and a control step of causing said reading step to start reading the sheet-like original based on a designation of the data which was Judged as the parameter by said Judgment step and for causing said process step to process the image data based on the sheet-like original read by said reading means by using the data which was judged as the parameter in said judgment step.

15. A computer readable program, stored in a storage medium, for controlling a document processing apparatus connected to a network, said program comprising the steps of:

displaying a graphical image for performing setting of the document processing apparatus in the case of reading the sheet-like original by the document processing apparatus;

generating data to be used for operating the document processing apparatus for reading the sheet-like original, on the basis of the displayed graphical image; and transmitting the generated data via the network to the document processing apparatus that should read the sheet-like original for causing the document processing apparatus to read the sheet-like original based on the generated data.

16. A computer readable program, stored in a storage medium, for controlling a document processing apparatus connected to a network, said program comprising:

a reading step of reading a sheet-like original;

a process step of processing image data based on the sheet-like original read by said reading step;

a reception step of receiving data, from the network, to be used for operating the document processing apparatus to processing the image data based on the sheet-like original;

a setting step of setting ID (identification) data to the data received in said reception step;

an input step of inputting the ID data set in said setting step; and a control step of causing said reading step to start reading the sheet-like original in accordance with the data received by said reception means and then causing said process step to process the image data based on the sheet-like original read by said reading means, in a case where the ID data was inputted in said input step.

17. A computer readable program, stored in a storage medium, for controlling a document processing apparatus connected to a network, said program comprising the steps of:

generating data to be used for operating the document processing apparatus for reading the sheet-like original;

transmitting the generated data, via the network, to the document processing apparatus, together with a user ID (identification);

receiving a code to be used for identifying the transmitted data; and outputting the received code, wherein the generated data to be used for operating the document processing apparatus is the data capable of causing the document processing apparatus to read the sheet-like original by inputting the outputted code into the document processing apparatus on a data transmission destination.

18. An apparatus according to claim 1, wherein said process means prints the image data as a visual image based on the parameter.

19. An apparatus according to claim 1, wherein said process means transmits the image data to another apparatus based on the parameter.

20. The apparatus according to claim 19, wherein said process means transmits the image data to the apparatus on the network based on the parameter.

21. An apparatus according to claim 1, further comprising display means for displaying a guidance for handling the sheet-like original.

22. An apparatus according to claim 1, further comprising notify means for notifying the transmitter of the received data by said reception means, that said process means executed the process.

23. A method according to claim 3, wherein the setting of the document processing apparatus is displayed with the graphical image and is designated to a setting of handling for each page of the sheet-like original.

24. An apparatus according to claim 7, wherein said process means prints the image data as a visual image after processing the image data based on the parameter.

25. An apparatus according to claim 7, wherein said process means transmits the image data to another apparatus based on the parameter.

26. An apparatus according to claim 25, wherein said process means transmits the image data to the apparatus on the network based on the parameter.

* * * * *

UNITED STATES PATENT AND TRADEMARK OFFICE
CERTIFICATE OF CORRECTION

PATENT NO.   :  6,092,088

DATED        :  July 18, 2000

INVENTOR     :  SHOJI TAKEDA

It is certified that error appears in the above-identified patent and that said Letters Patent is hereby corrected as shown below:

COVER PAGE

After "22] Filed", please insert the following:
--[*] Notice: This patent issued on a continued prosecution application filed under 37 C.F.R. 1.53(d) and is subject to the twenty year patent term provisions of 35 U.S.C. 1.54(a)(2).--

UNITED STATES PATENT AND TRADEMARK OFFICE
CERTIFICATE OF CORRECTION

PATENT NO. : 6,092,088
DATED : July 18, 2000
INVENTOR : SHOJI TAKEDA

It is certified that error appears in the above-identified patent and that said Letters Patent is hereby corrected as shown below:

COLUMN 4

Lines 34-35, "controlled a" should read --a controlled--.

COLUMN 5

Line 41, "are a" should read --is a--.

COLUMN 6

Line 38, "explained the" should read --explained that the--.

COLUMN 12

Line 56, "a" (second occurrence) should be deleted.

UNITED STATES PATENT AND TRADEMARK OFFICE
CERTIFICATE OF CORRECTION

PATENT NO. : 6,092,088

DATED : July 18, 2000

INVENTOR : SHOJI TAKEDA

It is certified that error appears in the above-identified patent and that said Letters Patent is hereby corrected as shown below:

<u>COLUMN 13</u>

Line 7, "a" (second occurrence) should be deleted;
Line 28, "a" (second occurrence) should be deleted;
Line 37, "Judged" should read --judged--; and
Line 37-38, "Judgment" should read --judgment--.

Signed and Sealed this

Tenth Day of April, 2001

*Attest:*

NICHOLAS P. GODICI

*Attesting Officer*   Acting Director of the United States Patent and Trademark Office